United States Patent [19]

Bonke et al.

[11] Patent Number: 4,866,309

[45] Date of Patent: Sep. 12, 1989

[54] MULTIPLEXED BUS ARCHITECTURE FOR CONFIGURATION SENSING

[75] Inventors: Carl Bonke, Rancho Santa Margarita; Han Jen, Diamond Bar; Marc Goldstone, Irvine, all of Calif.

[73] Assignee: Western Digital Corporation, Irvine, Calif.

[21] Appl. No.: 220,533

[22] Filed: Jul. 18, 1988

[51] Int. Cl.⁴ ............... G06F 11/20; G05B 24/02; H03K 19/094; H03K 17/04
[52] U.S. Cl. ................... 307/475; 307/242; 307/473; 307/468; 364/716; 340/825.91
[58] Field of Search ............ 307/475, 473, 465, 468, 307/241, 242, 243, 571, 530; 364/705, 712, 716; 340/825.91; 365/231, 196

[56] References Cited

U.S. PATENT DOCUMENTS

| | | | |
|---|---|---|---|
| 4,486,753 | 12/1984 | Saeki et al. | 307/242 X |
| 4,608,504 | 8/1986 | Yamamoto | 307/475 X |
| 4,673,830 | 6/1987 | Giorgetta et al. | 307/242 X |
| 4,697,095 | 9/1987 | Fujii | 307/475 X |
| 4,736,115 | 4/1988 | Storey | 307/242 X |
| 4,746,815 | 5/1988 | Bhatia et al. | 307/242 X |
| 4,808,844 | 2/1989 | Ozaki et al. | 307/243 |

Primary Examiner—Stanley D. Miller
Assistant Examiner—David R. Bertelson
Attorney, Agent, or Firm—Christie, Parker & Hale

[57] ABSTRACT

The invention provides a circuit for use with a standard bidirectional databus having an active current device providing a first logic level in combination with a selectably jumpered passive resistance device providing a second logic level, the active element responsive to an enable signal whereby tristating the bus write drivers and reading the bus will sense a configuration determined by selection of the jumper.

8 Claims, 3 Drawing Sheets

4,866,309

MULTIPLEXED BUS ARCHITECTURE FOR CONFIGURATION SENSING

FIELD OF THE INVENTION

This invention relates generally to the sensing of selectable indicators by a computer system or microprocessor for peripheral configuration and similar parameters. In particular, this invention relates to integral current sink devices in combination with selectably jumpered pull-up resistors for use in conjunction with an existing tristatable address/data bus which is either bidirectional or unidirectional for configuration sensing.

BACKGROUND OF THE INVENTION

Integrated logic circuits which may be interfaced with multiple host computer or micro controller systems are prevalent in the current electronics market. To provide flexibility in the use of these circuits, it is often necessary to provide configuration information to the host microcontroller or the circuit itself to designate the configuration of the device in use.

Using a microprocessor-based controller as an example, the approach in the prior art has been to provide pull-up or pull-down resistors which are selectively jumpered to dedicated control or data lines on the microprocessor. This prior art technique is demonstrated in FIG. 1. Typically, a dedicated control line into the microprocessor was required for each configuration parameter. The user selected the configuration by installing a jumper between the control line interconnect and a pull-up resistor or a pull-down resistor on the circuit board. Use of a dedicated control line from the microprocessor for each parameter may have significant impact on the microprocessor connection capacity where numerous configuration parameters are required.

As an example, a microprocessor controlling a generic disk drive controller might require the following configuration information: buffer ram size 8K or 32K bytes; disk drive write format (MFM, RLL or NRZ); designation as drive number 1, drive number 2 or drive number 3; host computer configuration (IBM AT, IBM XT); other. This simple list of configuration parameters would require a minimum of 8 configuration identification lines to designate the selection of the various parameters. In the prior art, this would require 8 dedicated control lines from the microprocessor.

In addition, prior art systems required both a pullup and pull-down resistor to provide determinant identification of each selectable parameter. Providing both a pull-up and pull-down resistor requires additional circuit board space and jumper connection provisions. Further, no default configuration exists and a jumper to either the pull-up or pull-down resistor must be installed.

SUMMARY OF THE INVENTION

The present invention provides numerous advantages over the prior art. The number of resistors present on the circuit board for configuration identification is reduced by a factor of by eliminating the requirement for pull-down resistors. In addition, the present invention makes use of an existing bidirectional or unidirectional bus structure. As an example, the combination address-/data bus used by a microprocessor to read and write data to and from a logic circuit, memory buffer or the like may be employed to provide configuration information to the microprocessor.

The invention comprises an indicator circuit which may be used with an existing bus having tristate drivers for writing to and reading from the data lines of the bus. A current sink is provided for each bit of the bus and is attached to the output of the write driver. The current sink is responsive to the tristate disable signal for the write driver. A pull-up resistor selectively connectable by a jumper to the write driver output is provided for each bit on the bus. Selection of the various configuration parameters is therefore accomplished for each bit on the bus by connection of the jumper to the pull-up resistor associated with that bit to provide a logical one signal, or allowing a default to the current sink means for that bit producing a logical zero signal.

The configuration parameters are sensed by the microprocessor by disabling the bus write drivers, thereby placing the drivers in a tristate condition, providing a bus disable or bus busy signal to other logic circuits connected to the bus and enabling the read drivers on the bus thereby sampling each bit for a logical one or logical zero as previously selected. DR

DETAILED DESCRIPTION

Figure 1:
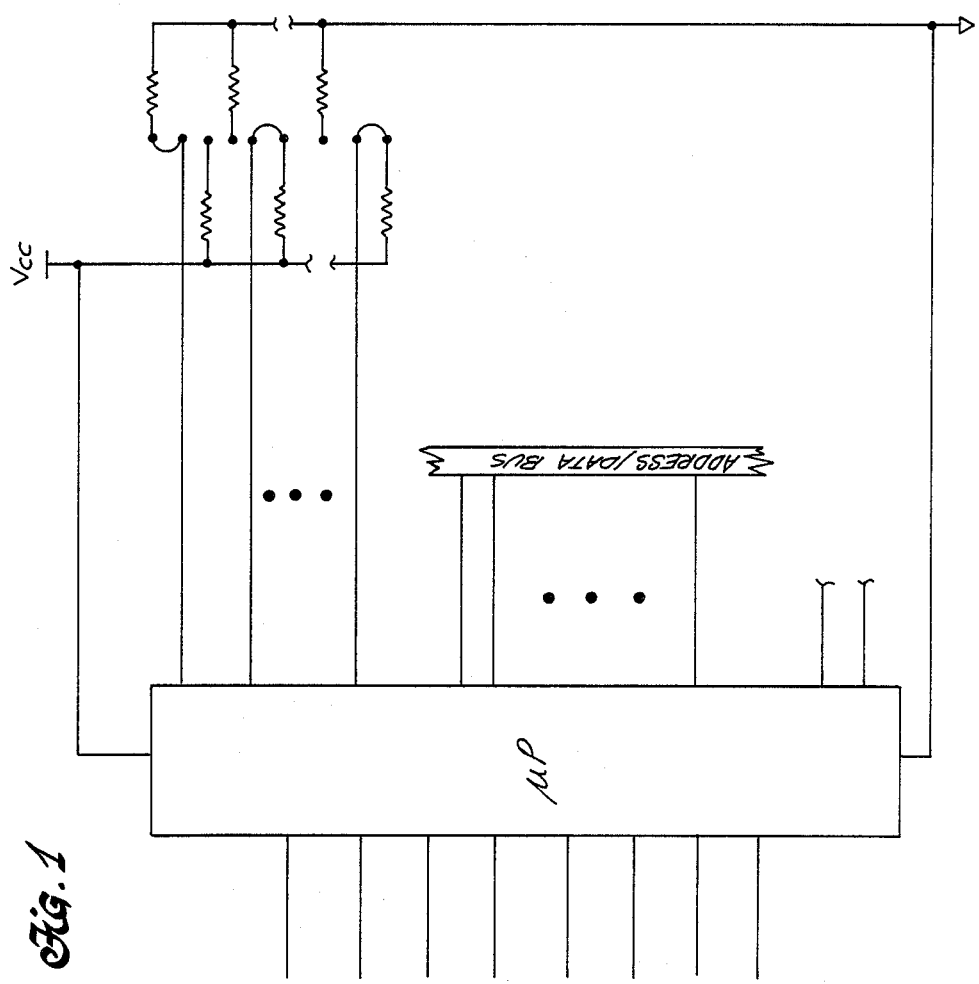
FIG. 1 is a schematic block diagram of a prior art implementation for a configuration sensing circuit.
Figure 2:
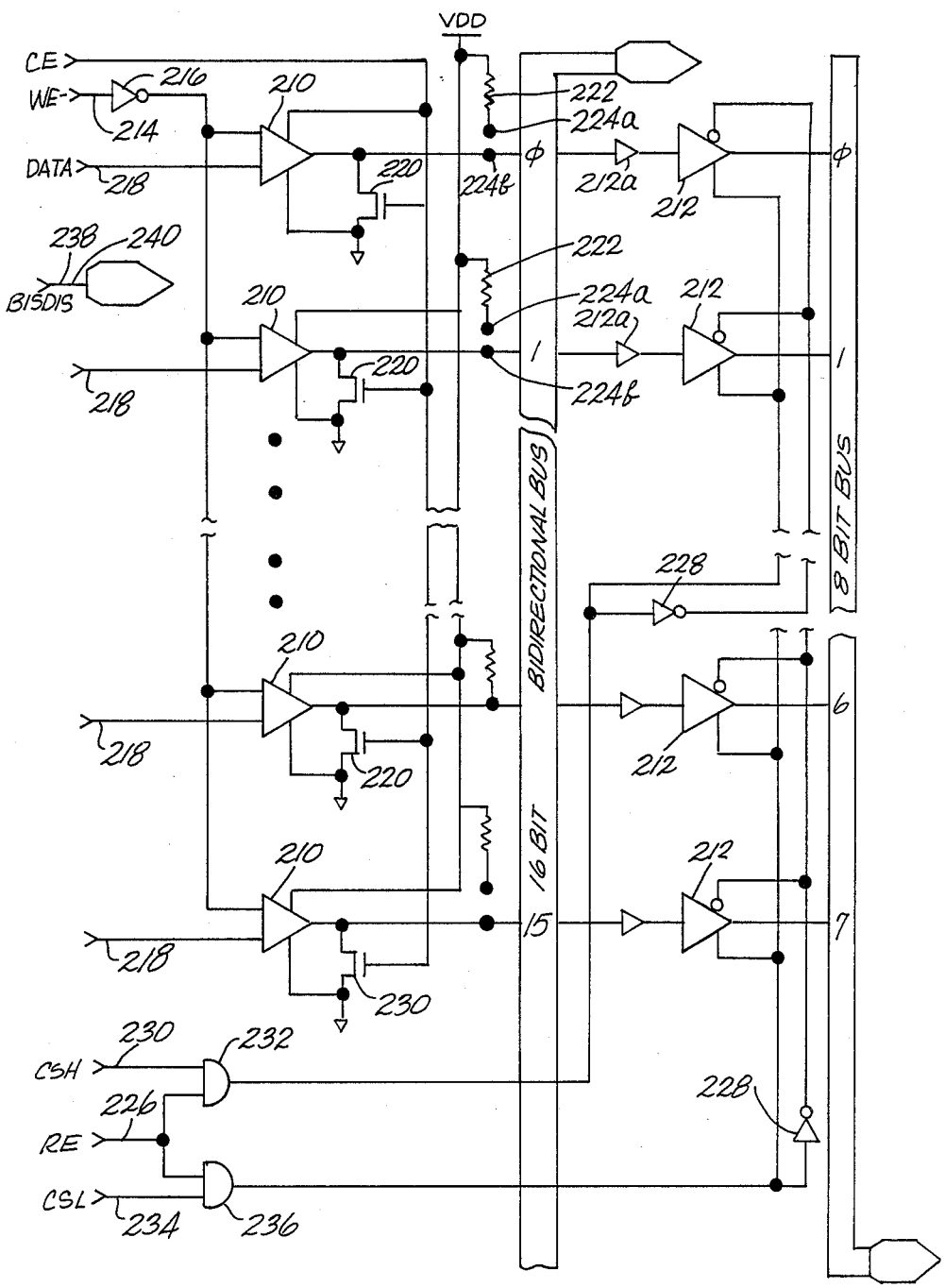
FIG. 2 is a schematic logic diagram of the preferred embodiment of the present invention.

The present invention makes use of the inherent characteristics of a bidirectional data bus to provide a multiplexed configuration indication circuit. As shown in FIG. 2, a bidirectional bus commonly comprises a write driver 210 and a read driver 212 for each bit on the bus. Normally a data bus will have 8 or 16 bits, however the invention may be implemented for any number of bits on the bus. A write enable signal, WE-, is present at input 214. WE- is provided to the enable port of each of the write drivers through an inverter 216. When WE- is at a logic level zero, the write driver is enabled, allowing data at the input 218 of each driver to be placed on the bus. WE- at a logic one level provides a disable signal placing each write driver in a tristated or high impedance condition. A current sink, shown in the embodiment of FIG. 2 as an MOS transistor 220 which is responsive to a configuration enable signal CE, is attached to the output of each of the write drivers. In the embodiment shown, CE is connected to the gate of the MOS transistor. The source of the transistor is connected to the output of the driver and the drain of the transistor is connected to ground. Assertion of CE turns the transistor on, providing a current sink to ground.

A resistor 222, connected to power supply voltage $V_{oo}$, is provided for each bit on the bus. Connection pads 224a and 224b are provided for insertion of a jumper to connect the resistor to the bus. As will be explained in more detail subsequently, connection of the jumper allows the resistor pulling the line high to overcome the current sink of the CMOS transistor, thereby providing a logic one indication for that bit on the bus.

Sensing of the configuration selected by connection of jumpers on the bits where a logic high is desired. The configuration is sensed by the microprocessor by enabling the read drivers on the bus. A read enable signal, RE, is provided on input 226. In the embodiment shown, the read drivers require a dual enabling input with normal and inverted signals. This is accomplished by providing an inverter 228 to provide the inverted enable signal to the inverted enable port of the read driver. An additional feature of the embodiment shown allows separate selection of the enablement of the read drivers providing an additional level of multiplexing. A chip select high signal CSH is provided on input 230. CSH is ANDed with RE through gate 232 providing an enable signal for a first bank of the read drivers. A chip select low signal CSL is provided on input 234. CSL is ANDed with RE through gate 236 and provided to a second bank of read drivers. In the embodiment of FIG. 2, this third level of multiplexing allows sampling of 8 bits on a 16 bit bus, thereby requiring only 8 I/O lines on the microprocessor. Similar multiplexing could be provided for reducing a 32 bit bus to an 8 bit bus.

A bus disable signal, BUSDIS, is provided at input 238 and output to other circuits on the bus at output 240. BUSDIS may be a separate signal or may be derived from either WE- or RE to preclude other circuits on the bus from placing data on the bus while the microprocessor is reading the configuration parameters.

The current sink and pull-up resistor must have characteristics selected to match the characteristics of the bus and to compliment each other. The current sink must provide sufficient current drawing capability to draw the bus data line low with the write driver in a tristated condition. The pull-up resistor is selected to pull the data line high with the jumper installed; again, with the write driver in the tristated condition. The resistance value must be selected such that voltage drop across the resistor at the maximum current draw of the current sink does not cause the data line voltage to drop below the minimum voltage for a logic level high. Further, when the write driver is enabled, the current sink is disabled. In the embodiment shown, WE- low enables the write driver through the inverter 216. CE deasserted provides a low signal at the gate of the CMOS transistor thereby turning off the transistor. Leakage current on the CMOS transistor must be sufficiently low to preclude interference with the signal output of the write driver. Similarly, the value of the resistor tying the data line high when jumpered, must allow the write driver to pull the data line low. In addition to the absolute values of signals on the data line, the timing of data pulses may be impacted by the jumpered resistor.

Figure 3:
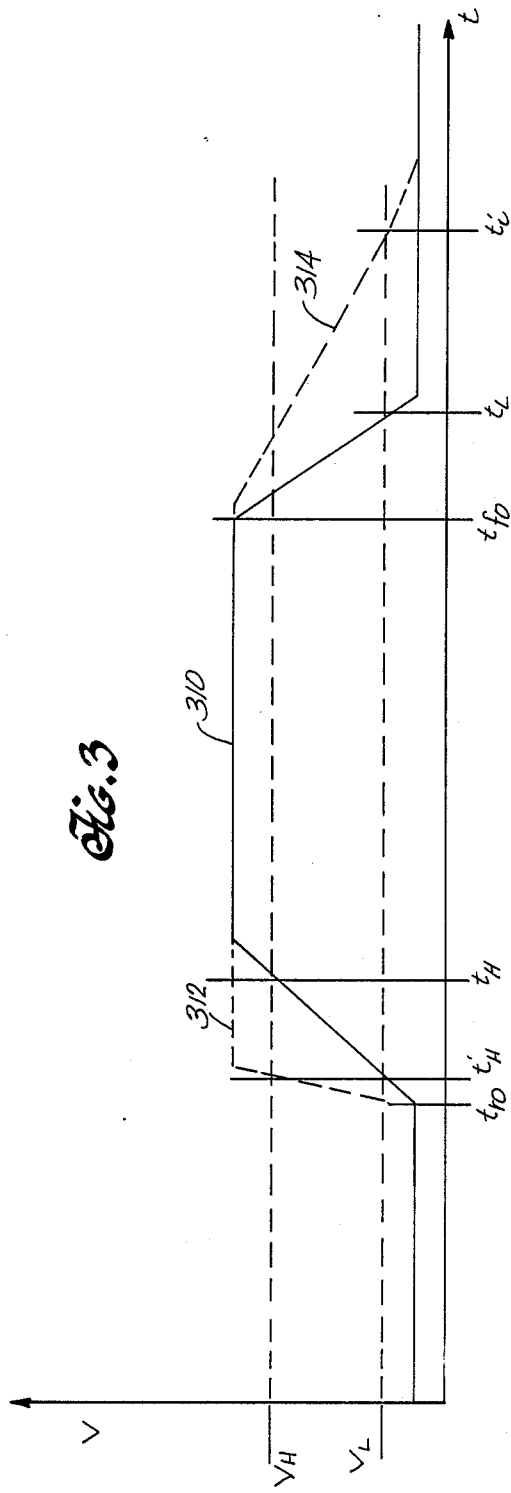
FIG. 3 is a timing diagram exemplifying the requirements for implementation of the invention on an data bus.

FIG. 3 demonstrates the alteration in a data pulse characteristic caused by jumpering of the resistor onto the data line. The normal data pulse 310 begins to rise at $t_{r0}$. The rising pulse reaches the minimum high level threshold $V_H$ at time $t_H$. Jumpering of the resistor to the data line adds voltage to the line, thus sharpening the leading edge of the pulse as shown by pulse edge 312. The rising pulse with the resistor jumpered into place crosses the voltage high threshold at $t'_H$. Sharpening the leading edge of the pulse in this manner will have a minimum impact on timing in most logic applications. The trailing edge of the pulse, however, provides more difficulty. The normal data pulse, going low without the resistor jumpered, begins to fall at $t_{f0}$. The current sink capability of the write driver draws the line voltage to the threshold for a logic level $V_L$ by time $t_L$. Jumpering of the resistor onto the data line results in an extension of the trailing edge of the pulse shown by line 314, which crosses the logic level low voltage threshold at $t'_L$. Selection of the value for the pull-up resistor must be such to preclude extension of the fall time of the data pulse beyond acceptable limits for the data bus. Table 1 provides typical component values for the CMOS transistor and pull-up resistor to accomplish data line voltage and timing requirements.

TABLE 1

| CMOS Transistor | | Pull-Up |
|---|---|---|
| Length (Mm) | Width (Mm) | Transistor (K ohm) |
| 13 | 2.6 | 1–21 |
| 10 | 2.6 | 1–16.5 |
| 8 | 2.6 | 1–13 |

$^a$with current design (13 M × 2.6 M). Resistor range is 1 to 21K ohm.

The invention is particularly applicable for use with data busses employing low noise tristate drivers such as those described in patent application Ser. Nos. 07/035,602 and 07/067,467 having a common assignee with the present application, the disclosures of which are herein incorporated by reference. The drive characteristics of such low noise drivers preclude hard wiring of a current sink to the data line. Timing constraints on the rise time of a data pulse would be violated if a current sink were present and enabled on the data line.

In operation of the invention as shown in FIG. 2, normal data bus communication is accomplished by disabling the current sink CMOS transistors (CE low), enabling the bus (BUSDIS low), and writing to the bus by enabling the write drivers (WE- low) for writing data present on the input of the write drivers to the data bus with the read drivers tristated by (RE low). Conversely, data may be read from the bus by tristating the write drives WE-high) and enabling the read drivers (RE high). Multiplexing of the read drivers is accomplished by selecting CSL or CSH high as required. Sensing configuration is accomplished by disabling the bus (BUSDIS asserted) and enabling the current sinks on the data lines (CE high), thereby turning on the CMOS transistors, drawing current to ground. Configuration parameters which are defaulted to the low level will thereby indicate a logic level 0. Configuration parameters which have been jumpered to the pull-up resistors will indicate a logic level 1 on the data line. Enabling the read drivers (RE high) with chip select CSH high will provide 8 bits of configuration data to the microprocessor. Table 2 provides a typical configuration select matrix for a disk drive controller requiring 8 bits of a data bus.

Having now described the invention in detail in accordance with the requirements of the patent statutes, those skilled in this art will have no difficulty in making changes and modifications in the individual circuit elements or their relative connections in order to meet specific requirements or conditions. Such changes and modifications may be made without departing from the scope and spirit of the invention as set forth in the following claims.

TABLE 2

| Data Lines | Buffer | | Drive | | Configuration Parameters Host | | | | Disk Data | | |
|---|---|---|---|---|---|---|---|---|---|---|---|
| | 8K | 32K | D0 | D1 | XT | AT | PS/2 | SCSI | MFM | RLL | NRZ |
| 0 | 1 | 0 | | | | | | | | | |
| 1 | | | 1 | 0 | | | | | | | |
| 2 | | | | | 1 | 0 | | | | | |
| 3 | | | | | | | 1 | 0 | | | |
| 4 | | | | | | | | | 1 | 0 | |
| 5 | | | | | | | | | | | 1 |
| 6 | | | | | | | | | | | |
| 7 | | | | | | | | | | | |

What is claimed is:

1. An externally selectable multiplexed indicator circuit for connection to a data line of a bidirectional bus comprising:
   a disable signal;
   a write driver circuit having a first normal data state and a second high impedance state, selectable responsive to the disable signal;
   the write driver further having a data input and an output connected to the data line;
   an active current device having first inactive state and a second active state responsive to the disable signal, and providing a first logic level, the current device connected to the data line;
   a resistance means for providing a second logic level selectively connectable to the data line; and
   means for reading the data line.

2. An indicator circuit as defined in claim 1 wherein the current device comprises:
   a MOS transistor having a gate connected to the disable signal;
   a drain connected to electrical ground; and
   a source connected to the data line.

3. An indicator circuit as defined in claim 2, wherein the resistance means comprises:
   a resistor, having a first connection to a power supply voltage and a second connection to a first jumper pad;
   a second jumper pad connected to the data line; and
   a jumper selectively connectable between the first jumper pad and second jumper pad.

4. An indicator circuit as defined in claim 1 wherein the means for reading the data line comprises a second driver circuit having a first high impedance state and a second normal state;
   and a read enable signal connected to the second driver circuit for selecting the normal state of the second driver circuit.

5. An indicator circuit as defined in claim 4 further comprising:
   a bus disable signal, the bus disable signal asserted concurrently with the read enable signal whereby other circuits connected to the data bus are precluded from placing data on the data lines of the bus while the second driver circuit reads the selected indicator on the data line.

6. An externally selectable multiplexed indicator circuit for connection to a data line of a bidirectional data bus having a first read driver responsive to a read signal; a low noise write driver, responsive to a write signal; and a bus disable signal, the improvement comprising:
   a MOS transistor having a gate inversely responsive to the write signal; a drain connected to electrical ground; and a source connected to the data line;
   a resistor having a first connection to a power supply voltage and a second connection to a first jumper pad, the resistance value of the resistor proportional to the channel current of the CMOS transistor;
   a second jumper pad connected to the data line; and
   a jumper for selective connection between the first and second jumper pads.

7. An externally selectable indicator circuit as defined in claim 6 wherein the channel current of the CMOS transistor is in the range of 40 to 160 microamps and the resistance value of the resistor is between 13K ohms and 16.25K ohms.

8. A bidirectional data bus circuit providing multiplexed selectable configuration indicator connections comprising:
   a plurality of data lines;
   a write disable signal;
   a configuration signal assertable in conjunction with the write disable signal;
   a read signal;
   a plurality of tristate write driver circuits of like number and individually associated with the data lines, each of said write drivers having a data input and an output connected to the associated data line, each write driver further having a first state for writing data to the data line and a second high impedance state responsive to the write disable signal;
   a plurality of CMOS transistors of like number and individually associated with the data lines, each CMOS transistor having a gate responsive to the configuration signal, a drain connected to electrical ground; and a source connected to the associated data line;
   a plurality of resistors of like number and in individual association with the data lines, each resistor having a first connection to a power supply voltage and a second connection selectively connectable to the associated data line; and
   a plurality of tristate read driver circuits of like number and individually associated with the data lines, each of the read driver circuits having an input connected to the data line and an output, each read driver circuit further having a first high impedance state and a second state responsive to the read signal whereby data may be read from the associated dateline and provided at the read driver output.

* * * * *